United States Patent
Ogawa et al.

(10) Patent No.: US 6,761,841 B2
(45) Date of Patent: Jul. 13, 2004

(54) METHOD FOR EXTRUDING TIRE RUBBER MATERIAL

(75) Inventors: Yuichiro Ogawa, Tokyo (JP); Shuhei Iizuka, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 386 days.

(21) Appl. No.: 09/986,716

(22) Filed: Nov. 9, 2001

(65) Prior Publication Data

US 2002/0089077 A1 Jul. 11, 2002

(30) Foreign Application Priority Data

Nov. 22, 2000 (JP) .......................................... 2000-355402

(51) Int. Cl.$^7$ .......................... B29C 47/00; B29C 47/92
(52) U.S. Cl. ................. 264/40.1; 264/40.6; 264/211.21
(58) Field of Search ............................... 264/40.1, 40.6, 264/211.21

(56) References Cited

U.S. PATENT DOCUMENTS

| | | | |
|---|---|---|---|
| 4,155,789 A | | 5/1979 | Wireman et al. |
| 4,171,193 A | | 10/1979 | Noriega |
| 4,431,598 A | * | 2/1984 | Korpman .................... 264/40.7 |
| 4,963,207 A | | 10/1990 | Laurent |
| 5,378,415 A | | 1/1995 | Gohlisch et al. |
| 5,666,891 A | | 9/1997 | Titus et al. |
| 6,372,070 B1 | * | 4/2002 | Iizuka et al. ................. 156/117 |

FOREIGN PATENT DOCUMENTS

| | | |
|---|---|---|
| DE | 34 05 931 A1 | 8/1985 |
| EP | 0 264 600 A1 | 4/1988 |
| EP | 0 391 003 A | 10/1990 |
| EP | 0 492 425 A | 7/1992 |
| EP | 0 508 080 A | 10/1992 |
| EP | 0 528 683 A1 | 2/1993 |
| EP | 0 968 814 A2 | 1/2000 |
| EP | 0 968 814 A | 1/2000 |
| EP | 1 084 814 A | 3/2001 |
| EP | 1 211 050 A2 | * 5/2002 |
| JP | A 61-37422 | 2/1986 |
| JP | B2 7-94155 | 10/1995 |
| JP | A 8-21354 | 1/1996 |
| JP | A 2000-79642 | 3/2000 |
| WO | WO 89/03754 | 5/1989 |
| WO | WO 90/14939 | 12/1990 |

OTHER PUBLICATIONS

U.S. patent application Ser. No. 09/327,613, Iizaka et al., filed Jun. 8, 1999.
Kautschuk Verarbeiten Mit Extruder + Zahnradpumpe, 4020 Plastverarbeiter, pp. 44–45 (1993) Jan., No. 1, Speyer DE.

* cited by examiner

Primary Examiner—Stephen J. Lechert, Jr.
(74) Attorney, Agent, or Firm—Oliff & Berridge, PLC (57) ABSTRACT

Tire rubber material is highly accurately and efficiently extruded by a positive displacement extruding system that includes, as seen from an upstream side of the tire rubber, a screw extruder unit, a gear pump unit and an extrusion head unit with an extrusion nozzle, which are connected in series with each other. While the tire rubber is caused to flow through the extruding system, the temperature of the rubber material is measured and controlled to be within a predetermined temperature range, in accordance with the measured temperature of the rubber material. The rubber material maintained at a controlled temperature is extruded from the extrusion nozzle, thereby improving the positive displacement performance of the extruding system.

8 Claims, 6 Drawing Sheets

METHOD FOR EXTRUDING TIRE RUBBER MATERIAL

BACKGROUND OF THE INVENTION

1. Field of the Invention

The present invention relates to a method for extruding tire rubber material to be applied onto the outer peripheral surface of a rotatable support for successively forming a green tire thereon in a highly accurate and efficient manner.

2. Description of the Related Art

Pneumatic tires comprise reinforcing members such as rubberized cords, and various rubber members. Therefore, prior to vulcanization of tires, it is necessary to form a green tire by laying reinforcing materials such as unvulcanized rubber materials and unvulcanized rubberized cord materials.

Recently, properties required for tires tend to be highly sophisticated and more diversified, with a resultant diversification of tire-constructional members and complication of tire shaping steps. Therefore, it is difficult to completely automate the shaping step and manual works are still required in many instances, making it difficult to significantly improve the tire shaping efficiency and laying accuracy of various materials. Particularly, since the laying accuracy is highly influential over the quality of tires, it is strongly demanded to improve the laying accuracy together with the increase of the shaping efficiency.

In order to satisfy such demands, JP-B-7-94155 discloses a technology wherein an outlet orifice of a positive displacement extruder is located adjacent to a position for feeding a rubber material onto a rotatable support and the robber material is directly extruded on the support through the outlet orifice.

With the technology disclosed in JP-B-7-94155, it is difficult to maintain the cross-sectional shape of a continuously extruded rubber material during the laying, due mainly to the so-called surging, i.e., fluctuation of the extrusion amount inherent to the extruder when the extruded rubber material has particularly a thin gauge. And also, the following problem is caused because various rubber materials are laid on the rotating support.

That is to say, since the viscoelastic characteristic differs in accordance with the kind of the rubber material, the die swell quantity tends to differ accordingly. Thus, it is required to take some measure for controlling the cross-sectional shape of the rubber material to be laid. This is attained by replacing the die with another die, or by making the die form variable. In any case, such measure for coping with the different die swell quantities requires time-consuming process, and often lowers the laying productivity.

To solve this problem, JP-A-8-21354 discloses a positive displacement pump having a rotary valve enabling to feed a highly viscous material such as tire rubber material at a constant flow rate without deteriorating the volumetric precision, and facilitating the flow of material, and proposes that the tire rubber materials discharged from the positive displacement pump is fed onto a rotatable supporter.

However, the positive displacement pump disclosed in JP-A-8-21354 has a complicated structure and is faced with limitation of the feeding amount depending on the types of rubber materials, thereby making it difficult to achieve the desired improvement in productivity.

In order to cope with these problems, JP-A-2000-79642 discloses a positive displacement extruding system that includes, as seen from an upstream side of the tire rubber, a screw extruder unit, a gear pump unit and an extrusion head unit with an extrusion nozzle, which are connected in series with each other. A pair of rollers is arranged adjacent to the extrusion orifice and also to a rotatable support, so as to form a roller die by a gap between the rollers. The rubber material discharged from the extrusion orifice to have a gauge that exceeds the gap is passed through the roller die, so as to stabilize the cross-sectional shape of the rubber material, and is then adhered onto the rotating supporter.

The positive displacement extruding system disclosed in JP-A-2000-79642 makes it readily possible to compensate for the various die-swelling amounts that may be caused upon replacing rubber materials, to simplify the structure of the entire system, and to prevent limitations on feeding amounts of any types of rubber materials, thereby allowing to ensure a higher productivity. However, in order to enhance the flow property of the rubber material within the system, a relatively long time is often required so as to warm-up the rubber material. Moreover, when the flow property of the rubber material within the system is still insufficient, the extrusion nozzle may exhibit insufficient discharging performance for directly feeding the rubber material onto the rotatable support. It is highly desirable to eliminate these problems and improve the positive displacement extruding system disclosed in JP-A-2000-79642.

SUMMARY OF THE INVENTION

Accordingly, it is a primary object of the present invention to provide a technology that improves the positive displacement extruding system disclosed in JP-A-2000-79642 in such a manner as to achieve a sufficient flow property of the rubber material within the system and a satisfactory discharging performance of the extrusion nozzle.

According to one aspect of the present invention, there is provided a method for extruding a tire rubber material by a positive displacement extruding system that includes, as seen from an upstream side of the tire rubber, a screw extruder unit, a gear pump unit and an extrusion head unit with an extrusion nozzle, which are connected in series with each other, said method comprising the steps of: measuring the temperature of the rubber material flowing through the extruding system; and controlling the rubber material to be within a predetermined temperature, in accordance with the measured temperature of the rubber material, while the tire robber is caused to flow through the extruding system, and maintaining the predetermined temperature of the rubber material before it is extruded from the extrusion nozzle.

Advantageously, the rubber material flowing through the screw extruder unit and the gear pump unit is maintained at a temperature within a range of approximately 85–95° C., and the rubber material flowing through the extrusion head unit is maintained at a temperature within a range of approximately 95–100° C.

It is preferred that the screw extruder unit of the extruding system includes a cylinder and a screw that is rotatable in the cylinder, wherein the cylinder is controlled to have a temperature that is lower than the temperature of the rubber material flowing adjacent to a downstream end of the screw.

It is preferred that at least one of the screw extruder unit, gear pump unit and extrusion head unit of the extruding system is provided with a heater that is operated in accordance with the measured temperature of the rubber material, wherein the heater is operated before the extruding system is operated, so as to preheat the rubber material within the extruding system.

It is also preferred that at least one of the screw extruder unit, gear pump unit and extrusion head unit of the extruding system is provided with a pressure sensor for measuring the pressure of the rubber material flowing through the extruding system, wherein the screw extruder unit and/or gear pump unit is operated at a speed that is controlled in accordance with the pressure of the rubber material measured by the pressure sensor.

The extruding system may be charged with a rubber material at a temperature within a range of approximately 20–30° C., or with a rubber material at a temperature within a range of approximately 60–80° C.

According to another aspect of the present invention, there is provided a positive displacement extruding system for extruding a tire rubber material, including, as seen from an upstream side of the tire rubber, a screw extruder unit, a gear pump unit and an extrusion head unit with an extrusion nozzle, which are connected in series with each other, said system comprising: at least one temperature sensor provided for at least one of said screw extruder unit, said gear pump unit and said extrusion head unit, for measuring the temperature of the rubber material flowing through the extruding system; and control means for controlling the robber material to be within a predetermined temperature, in accordance with the measured temperature of the rubber material, while the tire rubber is caused to flow through the extruding system, and maintaining the predetermined temperature of the rubber material before it is extruded from the extrusion nozzle.

Advantageously, the control means comprises at least one heater provided for at least one of the screw extruder unit, gear pump unit and extrusion head unit, wherein said at least one heater is operable in accordance with the measured temperature of the rubber material.

It is preferred that the positive displacement extruding system according to the present invention further comprises at least one pressure sensor provided for at least one of the screw extruder unit, gear pump unit and extrusion head unit, for measuring the pressure of the rubber material flowing through the extruding system, wherein the screw extruder unit and/or gear pump unit is operable at a speed that is controlled in accordance with the pressure of the rubber material measured by the pressure sensor.

BRIEF DESCRIPTION OF THE DRAWINGS

The present invention will be described below in further detail, with reference to the preferred embodiment shown in the accompanying drawings.

DETAILED DESCRIPTION OF THE PREFERRED EMBODIMENT

Figure 1:
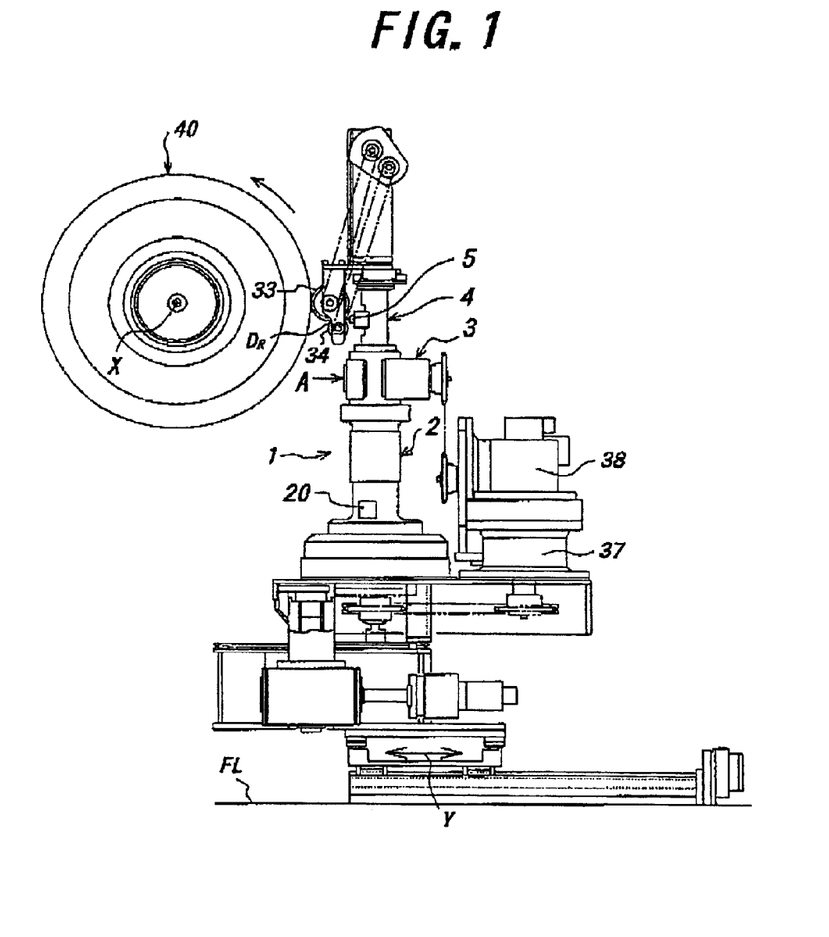
FIG. 1 is a side view of a positive displacement extruding apparatus for carrying out the method according to the present invention, in combination with a roller die that is arranged adjacent to a rotatable support.

Referring now to FIG. 1, there is shown an extruding system 1 for extruding an unvulcanized tire rubber material having a predetermined constant cross-section, with a predetermined constant volume. The extruding system 1 includes a screw extruder unit 2; a gear pump unit 3 coupled to the discharge end of the extruder unit 2, and an extrusion head unit 4 coupled to the discharge side of the gear pump unit 3 and including an extrusion nozzle 5. The extruding system 1 is of a positive displacement type, mainly by virtue of the gear pump unit 3. The extruding system 1 to which the present invention may be suitably applied is generally disclosed in the applicants' co-pending U.S. patent application Ser. No. 09/327,613, the disclosure of which is herein incorporated by reference.

Figure 2:
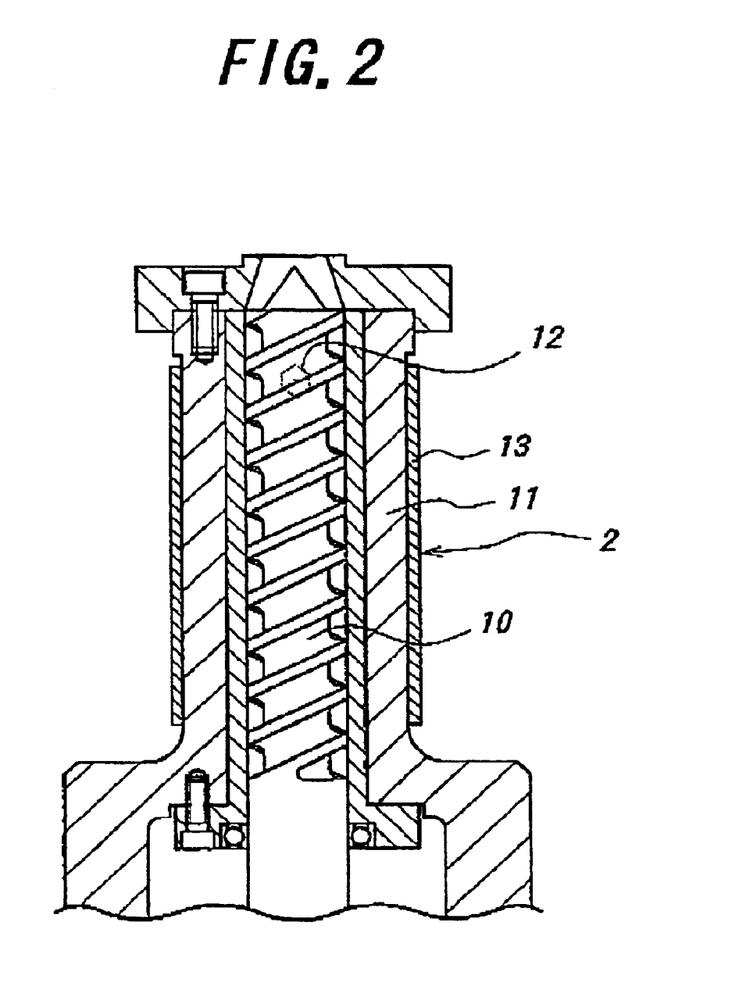
FIG. 2 is a sectional view of the extruder body shown in FIG. 1, taken along a plane including the screw axis.

As shown in FIG. 2, the screw extruder unit 2 includes a screw 10 that is rotatably supported in a cylinder 11. For measuring the temperature of the rubber material flowing through the interior of the cylinder 11, a temperature sensor 12 is provided at the downstream portion of the screw 10, which may be comprised of a thermistor. A heater 13 is arranged to surround the cylinder 11, for heating the rubber material flowing through the interior of the extruder unit 2. The heater 13 is preferably comprised of an electric hot wire.

Figure 3:
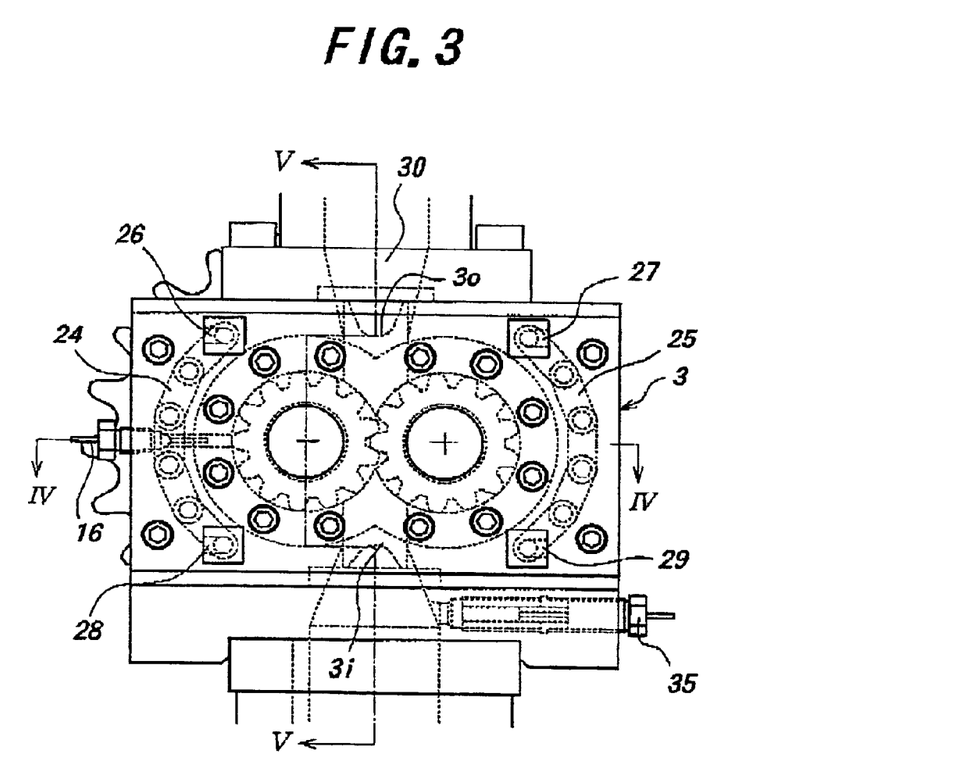
FIG. 3 is a rear view of a gear pump of the extruding apparatus shown in FIG. 1, as seen from the direction of arrow A.
Figure 4:
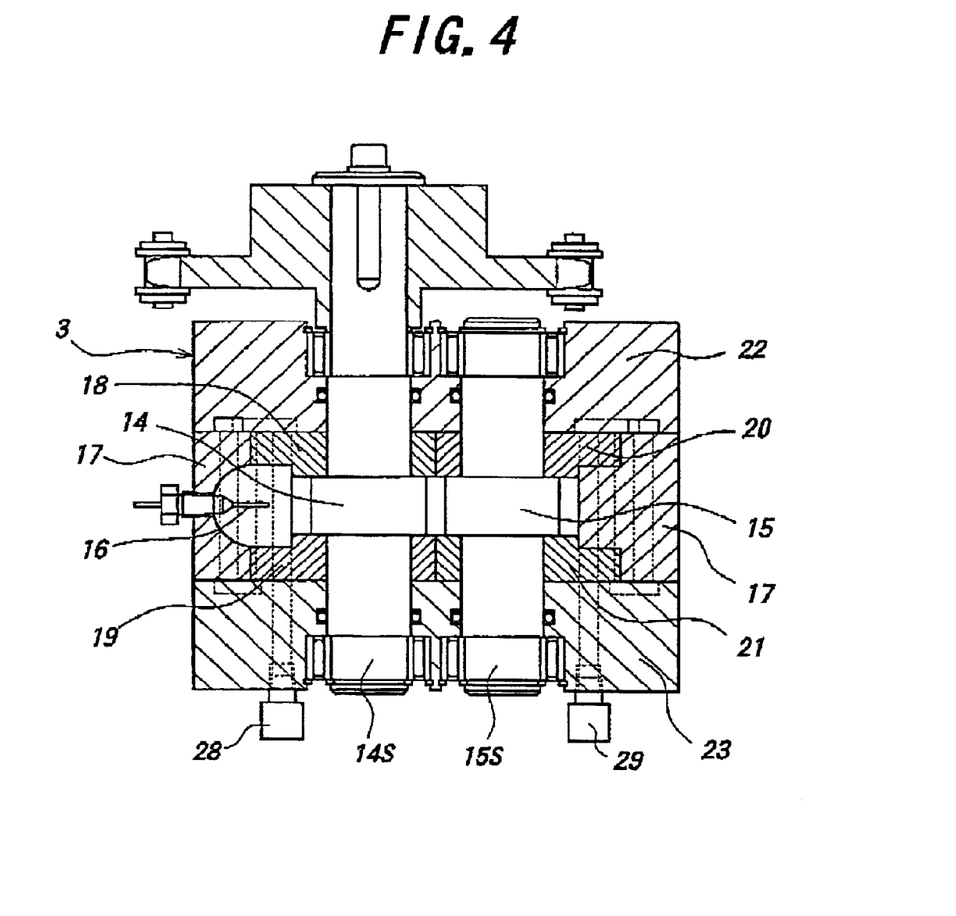
FIGS. 4 and 5 are sectional views of the gear pump, taken along the lines IV—IV and V—V in FIG. 3, respectively.
Figure 5:
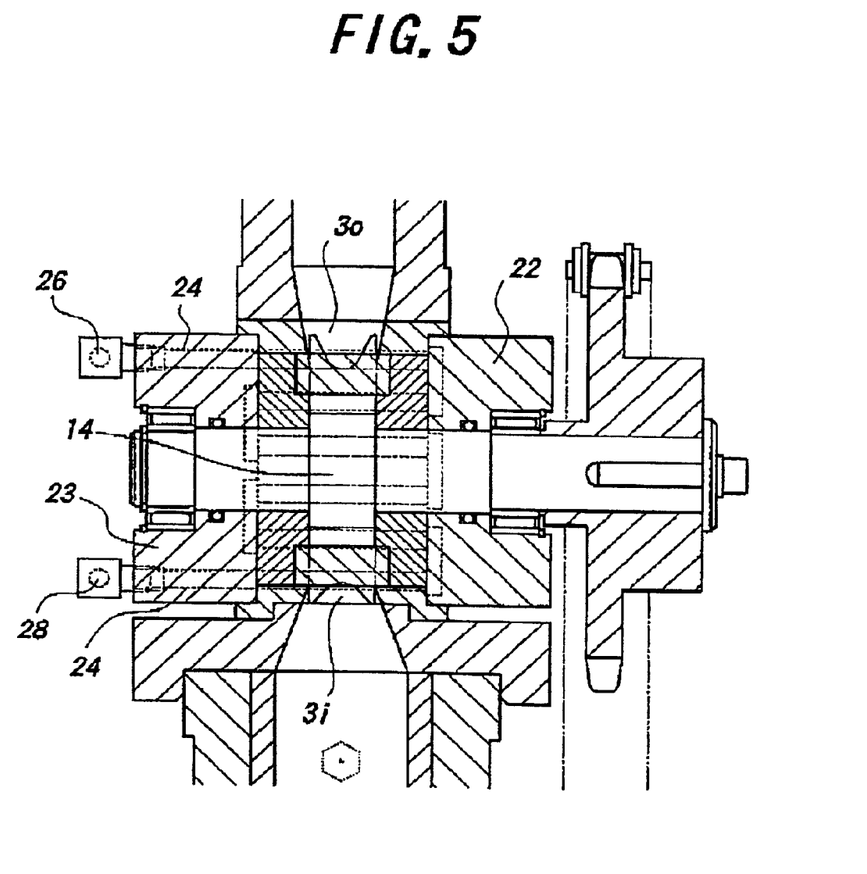

As shown in FIGS. 3 to 5, the gear pump unit 3 includes a driving gear 14 and a driven gear 15, which are in mesh with each other and rotatable in opposite directions. For measuring the temperature of the rubber material flowing through the interior of the gear pump unit 3, a temperature sensor 16 is provided adjacent to at least one of the gears 14, 15, i.e., adjacent to the driving gear 14 in the illustrated embodiment. Incidentally, it is assumed that the gear pump unit 3 includes a casing that is divided into five pieces comprising an integral main casing portion 17 arranged for circumscribing the gears 14, 15 from the outer peripheral sides thereof, four side casing portions 18, 19, 20, 21 on the opposite sides of the gears 14, 15, respectively, as well as bearing parts 22, 23 for rotatably supporting the shafts 14s, 15s of the respective gears 14, 15. The temperature sensor 16 may be comprised of a thermistor that is arranged along a line connecting the center axes of the shafts 14s, 15s, passing through the widthwise center positions of the gears 14, 15 and through the center of the meshed region of the gears 14, 15.

The gear pump unit 3 is provided with a heater for heating the rubber material flowing therethrough. It is preferred that the heater is comprised of a pair of flow passages 24, 25 surrounding the main casing portion 17 adjacent to the gears 14, 15, respectively, so that hot water or the like heat medium is allowed to circulate through the flow passages 24, 25 between supply ports 26, 27 and drain ports 28, 29 in the bearing part 23. The flow passages 24, 25 are comprised of longitudinal channels, as well as grooves connecting the terminal ends of the longitudinal channels with each other. As shown in FIG. 5, the longitudinal channels of the flow passages 24, 25 extend in the axial direction of the shafts 14s, 15s through the bearing part 23 and the side casing portions 18, 19, 20, 21. The grooves connecting the longitudinal channels are formed between opposite surfaces of the casing portions 18, 20 and bearing parts 22, 23. The flow passages 24, 25 are thereby folded back and forth in a crank-like manner, between the supply ports 26, 27 and the drain ports 28, 29.

Figure 6:
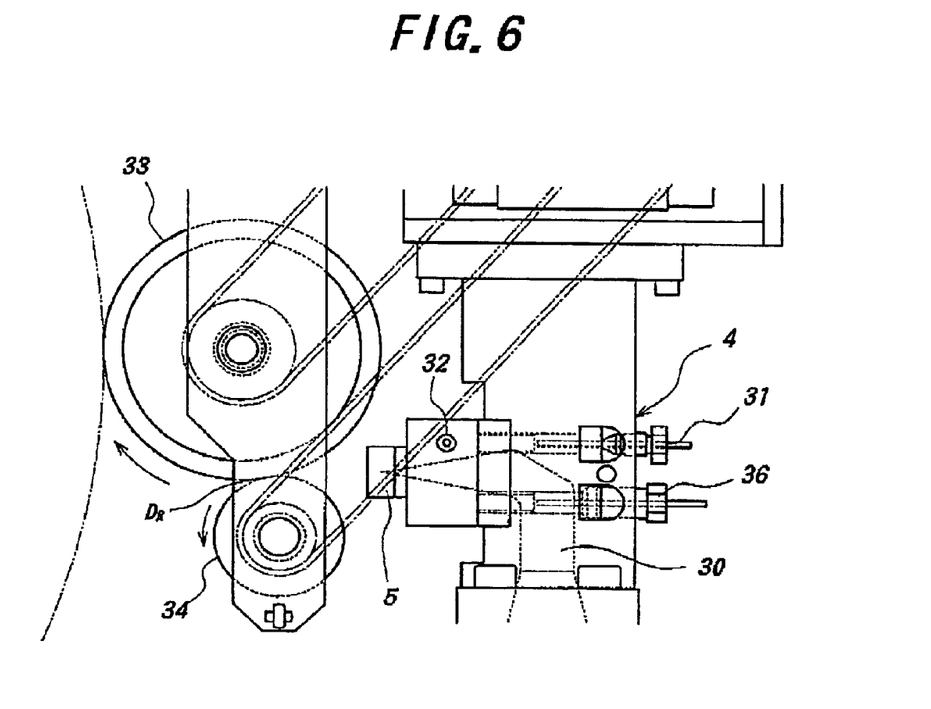
FIG. 6 is a side view of the extrusion head of the extruding apparatus shown in FIG. 1.

As shown in FIG. 6, the extrusion head unit 4 is provided with a temperature sensor 31 for measuring the temperature of the rubber material flowing through the interior of the extrusion head 4. The temperature sensor 31 may be comprised of a thermistor that is arranged adjacent to a flow passage 30 within the extrusion head unit 4. Further, a heater 32 is provided around the tip portion of the extrusion head unit 4 near the nozzle 5, and is preferably comprised of an electric hot wire.

In operation of the above-mentioned positive displacement extruding system 1, a predetermined kind of rubber material is charged from a feeding port 20 into the extruder unit 2, so as to apply a shearing force to the rubber material by the rotating screw 10 and thereby plasticize the rubber material while continuously extruding it toward the gear pump unit 3. At the same time, the temperature of the rubber material flowing through the extruder unit 2 is continuously measured by the temperature sensor 12. The rubber material charged into the extruding system 1 may be either a room-temperature rubber material typically at a temperature within a range of 20 to 30° C.; or a hot rubber material typically at a temperature within a range of 60 to 80° C.

The rubber material extruded toward the gear pump unit 3 in the plasticized state is directed from an inlet port 3i of the gear pump unit 3, through the meshed region of the driving gear 14 and the driven gear 15, toward an outlet port 3o of the gear pump unit 3, so as to be continuously discharged to the extrusion head unit 4 at a predetermined constant volume. At the same time, the ambient temperature of the driving gear 14 is continuously measured by the temperature sensor 16, and the output signal of the temperature sensor 16 is used as a parameter representing the actual temperature of the rubber material flowing through the gear pump unit 3.

The rubber material fed from the gear pump unit 3 into the extrusion head unit 4 is passed through the flow passage 30 and then extruded from the nozzle 5. At the same time, the temperature of the rubber material immediately before the nozzle 5 is continuously measured by the temperature sensor 31.

The temperatures of the rubber material measured by the three temperature sensors 12, 16, 31 are inputted as electrical signals into a control unit (not shown), and are thereby compared with those temperatures previously stored in the control unit which have been predetermined for the associated positions, respectively. When any one of the temperatures measured by the temperature sensors 12, 16, 31 is lower than the predetermined temperature, the temperature of the relevant position of the extruding system 1 is raised to the predetermined temperature by operating the associated heater. In this way, based on the result of the temperatures measured by the temperature sensors 12, 16, 31, the temperatures of the rubber material flowing through the extruder unit 2, gear pump unit 3 and extrusion head unit 4 are controlled to be within predetermined temperature ranges, and the rubber material maintained at the controlled temperature is extruded from the nozzle 5 at the end of the extrusion head 4. The extruded rubber material is fed to a roller die $D_R$ which, as shown in FIG. 6, is formed by a pair of rollers 33, 34 positioned adjacent to the nozzle 5 and rotating in the opposite directions as indicated by respective arrows.

Since, as explained above, the positive displacement extruding system 1 controls and maintains the predetermined temperatures of the rubber material flowing through the screw extruder unit 2, gear pump unit 3 and extrusion head unit 4, it is possible to enhance the flow property of the rubber material and eliminate excessive warming time for the rubber material in advance. As a result, it is possible to markedly improve the constant volume discharging performance of the extrusion head unit 4 for directly feeding rubber material to the roller die $D_R$, and to thereby improve the positive displacement performance of the extruding system and productivity of green tires. Moreover, when the beaters 13, 24, 32 are operated before operating the extruding system 1, it is possible to preheat the screw extruder unit 2, gear pump unit 3 and extrusion head unit 4 with the nozzle 5 to the predetermined temperatures, thereby allowing rapid starting of the operation and replacement of the rubber material.

It is preferred that the temperature of the rubber material at a position near the screw 10 of the screw extruder unit 2, the temperature of the cylinder 11, and the temperature of the rubber material flowing through the gear pump unit 3, are maintained within a range of 85 to 95° C., and the temperature of the rubber material flowing within the head 4 is maintained within a range of 95 to 100° C., so as to improve the positive displacement performance. It is also preferred that the temperature of the cylinder 11 of the screw extruder unit 2 is maintained to be lower than the temperature of the rubber material flowing near the screw 10, so as to avoid biting of the rubber material and to improve the flow property of the rubber material.

Advantageously, the flow pressure of the rubber material is also controlled along with the temperature control thereof, so as to obtain an optimized extruding efficiency. To this end, there may be provided a pressure sensor 35 at a position near the screw 10 of the extruder unit 2 as shown in FIG. 3, and a pressure sensor 36 in the flow passage 30 of the extrusion head unit 4 near the gear pump unit 3 as shown in FIG. 6. In this instance, the pressure of the rubber material extruded by the screw 10 is measured by the pressure sensor 35, and the pressure of the rubber material fed by the gears 14, 15 is measured by the pressure sensor 36.

The output signals of these pressure sensors 35, 36 are inputted into the above-mentioned control unit and compared with the optimum pressure information previously stored in the control unit, such that the rotational speeds of the screw 10 of the screw extruder unit 2 and of the driving gear 14 of the gear pump unit 3 are controlled to the optimum rotational speeds, respectively, wherein the measured pressures coincide with the optimum pressures, respectively. It is preferred in this respect to adopt servo-motors 37, 38 (FIG. 1) for driving the screw 10 of the screw extruder unit 2 and the driving gear 14 of the gear pump unit 3.

With reference to FIG. 3, in order to form the predetermined three-dimensional shape of a green tire, the extruding system 1 according to the present invention is combined with a rotatable support 40 rotating in the direction of arrow, for continuously extruding a rubber material in the form of a rubber strip having a constant volume and constant a cross-sectional shape from the nozzle 5. The rubber material extruded from the nozzle 5 may be directly applied onto the outer peripheral surface of the rotatable support 40. However, in order to further stabilize the cross-sectional shape of the rubber material extruded from the nozzle 5, it is preferred that the rubber material is passed through the roller die $D_R$, immediately before it is applied onto the rotatable support 40.

Incidentally, it is assumed that the extruding system 1 is linearly movable in a horizontal plane, with reference to a working floor FL, in a first direction that is parallel to the center axis X of the rotatable support 40, and also in a second direction Y that is perpendicular to the direction X. The extruding system 1 is further movable along a toroidally curved surface of the rotatable support 40. As a result, it is possible to apply various rubber materials onto the outer peripheral surface of the rotatable support 40, with significantly improved operation efficiency.

It will be appreciated from the foregoing description that, according to the present invention, while the tire rubber is caused to flow through the extruding system, the temperature of the rubber material is measured and controlled to be within a predetermined temperature range, in accordance with the measured temperature of the rubber material. The rubber material maintained at a controlled temperature is extruded from the extrusion nozzle, thereby improving the positive displacement performance of the extruding system. It is therefore possible to eliminate or reduce warming time for the rubber material and significantly improve the discharging performance of the head with nozzle, thereby providing an extruding technology for a tire rubber material, capable of rapidly starting the operation, rapidly replacing the robber material, and remarkably improving the productivity.

While the present invention has been described above with reference to a preferred embodiment shown in the drawings, it is needless to say that various changes and/or modifications may be made without departing from the scope of the invention as defined by the appended claims.

What is claimed is:

1. A method for extruding a tire rubber material by a positive displacement extruding system that includes, as seen from an upstream side of the tire rubber, a screw extruder unit, a gear pump unit and an extrusion head unit with an extrusion nozzle, which are connected in series with each other, said method comprising the steps of:

measuring the temperature of the rubber material flowing through the extruding system; and controlling the rubber material to be within a predetermined temperature, in accordance with the measured temperature of the rubber material, while the tire rubber is caused to flow through the extruding system, and maintaining the predetermined temperature of the rubber material before it is extruded from the extrusion nozzle.

2. The method according to claim 1, wherein the rubber material flowing through the screw extruder unit and the gear pump unit is maintained at a temperature within a range of approximately 85–95° C.

3. The method according to claim 1, wherein the rubber material flowing through the extrusion head unit is maintained at a temperature within a range of approximately 95–100° C.

4. The method according to claim 1, wherein the screw extruder unit of the extruding system includes a cylinder and a screw that is rotatable in the cylinder, and wherein the cylinder is controlled to have a temperature that is lower than the temperature of the rubber material flowing adjacent to a downstream end of the screw.

5. The method according to claim 1, wherein at least one of said screw extruder unit, said gear pump unit and said extrusion head unit of the extruding system is provided with a heater that is operated in accordance with said measured temperature of the rubber material, and wherein said heater is operated before said extruding system is operated, so as to preheat the rubber material within said extruding system.

6. The method according to claim 1, wherein at least one of said screw extruder unit, said gear pump unit and said extrusion head unit of the extruding system is provided with a pressure sensor for measuring the pressure of the rubber material flowing through the extruding system, and wherein said screw extruder unit and/or said gear pump unit is operated at a speed that is controlled in accordance with the pressure of the robber material measured by said pressure sensor.

7. The method according to claim 1, wherein said extruding system is charged with a rubber material at a temperature within a range of approximately 20–30° C.

8. The method according to claim 1, wherein said extruding system is charged with a rubber material at a temperature within a range of approximately 60–80° C.

* * * * *